Oct. 23, 1951 W. G. PENDLETON, SR 2,572,657
HEAT CONTROL UNIT
Filed Sept. 6, 1949 2 SHEETS—SHEET 1

Willie G. Pendleton, Sr.
INVENTOR.

BY
Attorneys

Oct. 23, 1951     W. G. PENDLETON, SR     2,572,657
HEAT CONTROL UNIT

Filed Sept. 6, 1949     2 SHEETS—SHEET 2

Willie G. Pendleton, Sr.
INVENTOR.

Patented Oct. 23, 1951

2,572,657

UNITED STATES PATENT OFFICE 2,572,657

HEAT CONTROL UNIT

Willie G. Pendleton, Sr., Naples, Italy

Application September 6, 1949, Serial No. 114,173

3 Claims. (Cl. 171—97)

This invention relates to novel and useful improvements in operators or controls of the thermally responsive type adapted for operating various conventional elements or rendering various conventional items inoperative.

An object of this invention is to operate a switch which controls the conventional item such as a stove, relay or others in response to pressure increases of a fluid within a confined chamber, which pressure increase is reflected in expansion of a bellows, a part of the bellows being connected with one of the switch members.

Another object of this invention is to controllably regulate the effective or working volume of the closed or confined chamber by manual operation so as to define the upper and lower working limits of the device.

Ancillary objects and features will become apparent in following the description of the illustrated form of the invention.

Figure 1:
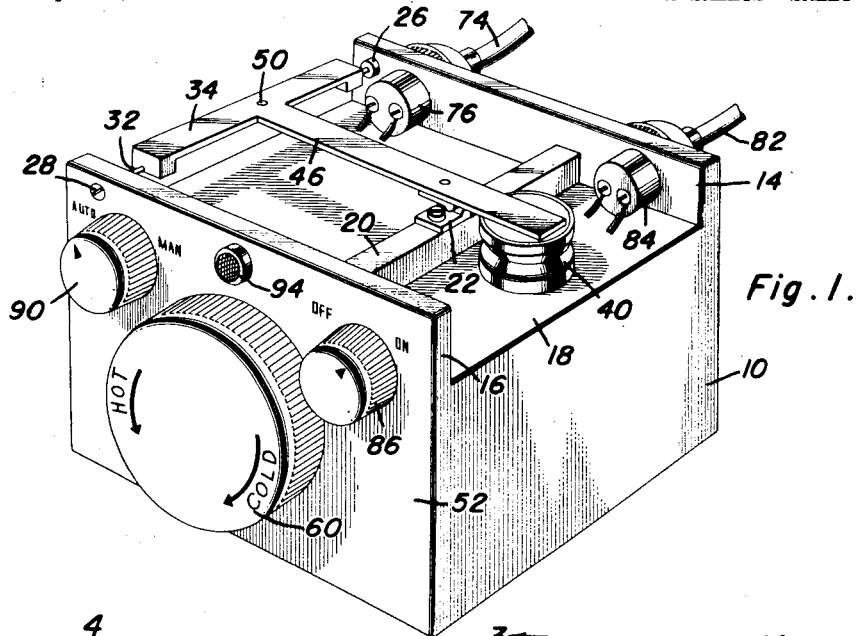
Figure 1 is a perspective view of the unit.
Figure 2:
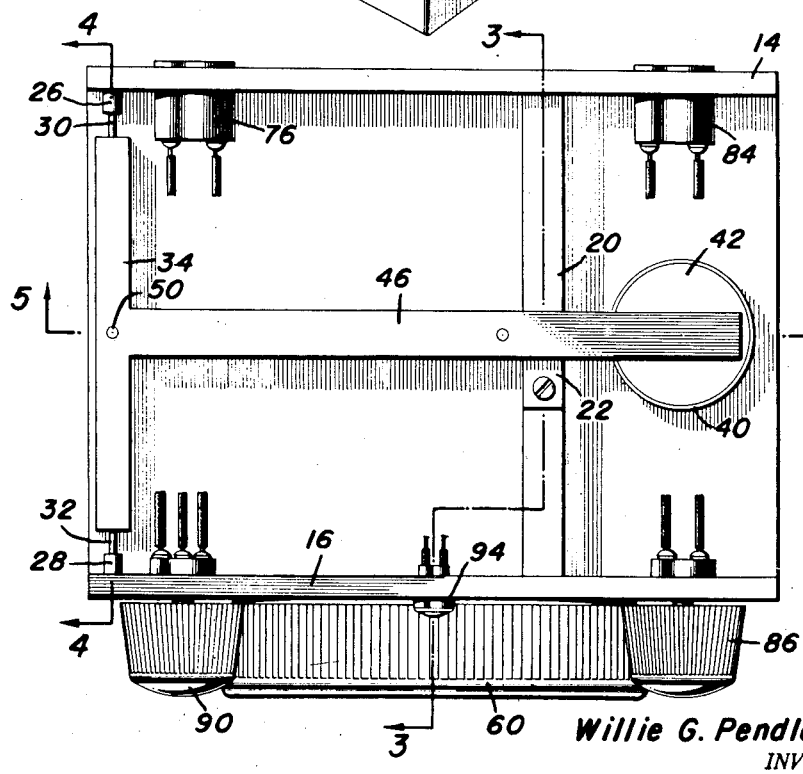
Figure 2 is a plan view of the device in Figure 1.
Figure 3:
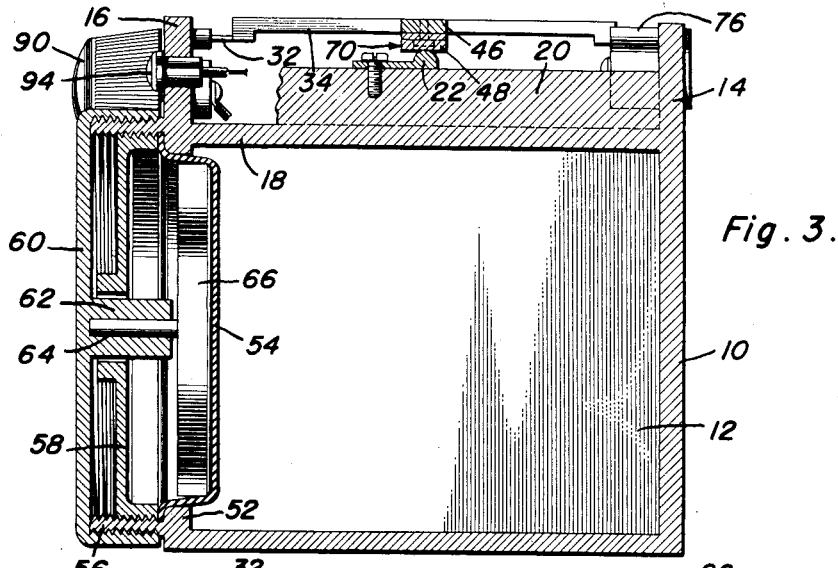
Figure 3 is a sectional view taken on the line 3—3 of Figure 2 and in the direction of the arrows.
Figure 4:
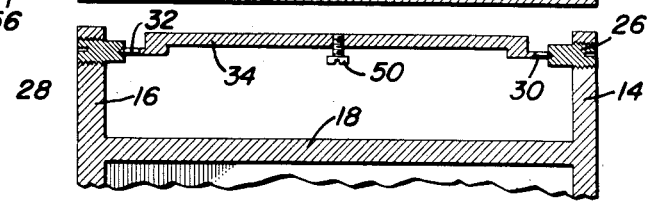
Figure 4 is a transverse view taken on the line 4—4 of Figure 2 and in the direction of the arrows.
Figure 5:
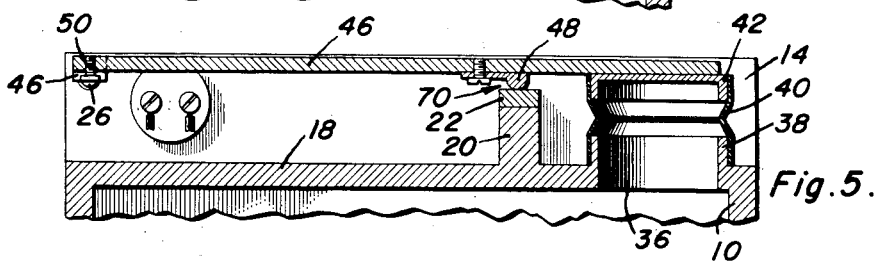
Figure 5 is a longitudinal view taken on the line 5—5 of Figure 2 and in the direction of the arrows.

The field of utility of the present invention is large. The invention may be adaptable for use in connection with operation of air conditioning apparatus, heat apparatus, electric relay which in turn may operate or cause to be operated, any number of electrically operative units, may be employed for rendering fire alarm operative and may be employed in any analogous or similar capacity. The actual use of the invention is left within the prerogative of the manufacturer. My invention consists of the operator or control apparatus for rendering the conventional units operative and inoperative or more or less effectual.

A receptacle 10 which may assume any desired shape is supplied. The illustrated receptacle forms an expandable fluid chamber 12 having any suitable type expandable material therein which will be largely determined by the capacity in which the device is employed. Air is an example of one expandable fluid employed in the chamber 12.

The receptacle or housing 10 has parallel side walls 14 and 16 respectively which extend above the upper surface of the top 18. A cross member 20 extends between the walls 14 and 16 and serves as a support for the contact 22 to be discussed in detail subsequently. A pair of manually adjustable bearings 26 and 28 respectively are threaded in the sides or walls 14 and 16 pivotally supporting the needle-like ends 30 and 32 of the pivot bar 34.

An opening 36 is formed in the top 18 of the receptacle 10 and has a lip 38 extending thereon. A sleeve type bellows 40 is disposed around the lip 38 and has a cap or closure 42 at the top thereof. Accordingly, differentials or changes in temperatures of the fluid within the chamber 12 will be reflected in increases in volume. The increases in volume will be reflected in expansion of the bellows 40 whereby the cap 42 will be lifted.

The pivot bar 34 has an arm 46 extending therefrom carrying a contact 48. This contact normally engages the contact 22. But, when the arm 46 is caused to be pivoted by expansion of the bellows 40 through the upward movement of the closure 42 pushing the arm 46 upwardly, the contacts 22 and 48 are separated. The two contacts together with the other described mechanism in association therewith forms a switch. A screw 50 is provided in the pivot bar 34 so that a lead wire may be connected therewith in order to establish electrical communication with the contact 48. The wire may simply be supported by the screw 50 and terminate in connection with the contact 48 or, the entire pivot bar 34 together with the arm 46 may be of electrically conductive material. Under these conditions the bearings 26 and 28 will be of electrically conductive material or, the entire receptacle 10.

Means for controllably regulating the working volume of the chamber 12 and the volume encompassed by the bellows 40 is provided in one side wall 52 of a receptacle 10. An aperture is formed in this wall and a membrane or diaphragm 54 is disposed in the aperture with the peripheral portion on the outside surface of the receptacle. An internally and externally threaded collar or member 56 is fixed with the side 52 of the receptacle. An externally threaded nut 58 is threadedly disposed in the collar 56 and bears against the peripheral part of the diaphragm or membrane 54 pressing it firmly against the outside surface of the side 52 and holding it in place. A cap 60 having a central shank 62 projecting therefrom is threadedly disposed on the external threads of the collar 56. The said shank 60 has a bore therein accommodating the pin 64 which has a head 66 fixed thereto. The head presses against the diaphragm 54, holding it within the chamber 12. By turning the cap 50 in one direction, it is unscrewed from the collar 56 and the force from the diaphragm 54 pushes the head backward. This manipulation increases the volume of the chamber 12 and also decreases the pressure of the expandable fluid therein. Accordingly, it will require more of a differential in heat to cause sufficient expansion of the bellows 40 to operate the switch generally indicated at 70. Adjustment of the cap 60 in the opposite direction causes the opposite result.

Figure 6:
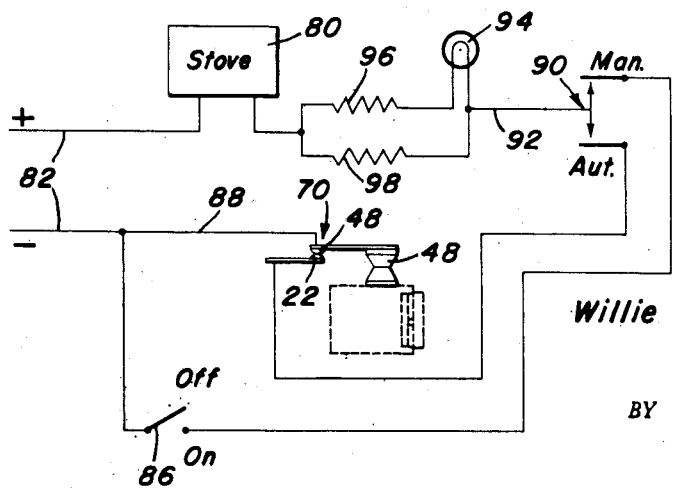
Figure 6 is a schematic wiring diagram of a typical electrical system employed in the invention.

A service circuit schematically indicated by the line 74 (see Figure 1) is plugged in the socket 76 which is carried by the wall 14. This service circuit may include any adaptable unit as previously discussed and in Figure 6 is schematically shown a stove 80 which is of course, is of the electrically operative type or, of the type employing any conventional fuel but controlled by electrical means. A source is conventional in nature and feeds the device through the line 82 which plugs in the socket 84, also carried by the wall 14.

Referring to the wiring diagram it is seen that the negative side of the line 82 has a switch 86 therein for control of the device in its total operative or inoperative condition. Also extending from the negative side of the line 82 is a conductor 88 which has for its purpose the establishment of electrical communication with the contact 48 of the switch 70. A two-way switch 90 is connected with the negative side of the line 82 on one pole thereof and also on the other pole thereof but through the switch contact 22. Accordingly, manipulation of the switch 90 leads to the obvious results of full manual operation or automatic operation, that is, by means of the described device.

Extending from the switch 90 is a line 92 for energizing the signal lamp 94 which is connected with the appliance 80 through the medium of the resistant members 96 and 98 respectively.

In operation, the device is simply connected with the unit which is to be controlled in accordance with temperature changes. The switch 86 is closed so that the operating circuit (see Figure 6) of the device is closed. When the switch 90 is moved to the automatic position, temperature increases will cause the switch 70 to open thereby breaking the remainder of the circuit which includes the appliance 80 together with the signal lamp 94.

When the manual operation is employed, the device is simply cut out of the circuit.

Having described the invention, what is claimed as new is:

1. A thermally responsive operator comprising a receptacle forming an expandable fluid chamber, a pressure responsive piston in communication with said chamber, means communicating with said chamber which is manually operable for selectively regulating the volume of said chamber, and a switch operatively connected with said chamber adapted to be connected with a service circuit, an operating circuit including said switch, a pair of switches in said operating circuit to switch said first mentioned switch in said operating circuit and to manually open and close said operating circuit respectively.

2. A thermostat comprising a receptacle having sides, a bottom and a top, an arm pivoted to said sides and disposed above said top, a switch operatively connected with said arm and said top and adapted to be opened and closed upon pivotal operation of said arm, said top having an opening therein, a diaphragm in communication with said opening and means carried by said diaphragm and displaceable thereby engaging said arm to pivotally operate said arm in response to pressure increases and decreases within said receptacle, one of said sides having an aperture therein, a piston disposed in said aperture and manual means for adjusting said piston inwardly and outwardly of said receptacle, a membrane disposed around said piston yieldingly opposing the inward operation of said piston which increases and decreases selectively the volume of said receptacle.

3. The combination of claim 2 and an externally threaded member threadedly carried by said receptacle and having a passage therein, said means for operating said piston being disposed in said passage, and the edges of said membrane being clamped by parts of said member against a part of said receptacle to hold said membrane fixed at its edges adjacent the aperture.

WILLIE G. PENDLETON, Sr.

REFERENCES CITED

The following references are of record in the file of this patent:

UNITED STATES PATENTS

| Number | Name | Date |
|---|---|---|
| 2,209,767 | Dillman | July 30, 1940 |